United States Patent
Li et al.

(10) Patent No.: US 11,405,383 B2
(45) Date of Patent: Aug. 2, 2022

(54) AUTHORIZATION CREDENTIAL MIGRATION METHOD, TERMINAL DEVICE, AND SERVICE SERVER

(71) Applicant: Huawei Technologies Co., Ltd., Shenzhen (CN)

(72) Inventors: Hui Li, Helsinki (FI); Zhuofei Li, Beijing (CN); Zi Wang, Beijing (CN); Xinmiao Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 16/476,988

(22) PCT Filed: Jan. 13, 2017

(86) PCT No.: PCT/CN2017/071189
§ 371 (c)(1),
(2) Date: Jul. 10, 2019

(87) PCT Pub. No.: WO2018/129726
PCT Pub. Date: Jul. 19, 2018

(65) Prior Publication Data
US 2019/0356653 A1    Nov. 21, 2019

(51) Int. Cl.
*H04L 29/06* (2006.01)
*H04L 9/40* (2022.01)

(52) U.S. Cl.
CPC ...... *H04L 63/0838* (2013.01); *H04L 63/0876* (2013.01); *H04L 63/10* (2013.01); *H04L 63/20* (2013.01)

(58) Field of Classification Search
CPC . H04L 63/0838; H04L 63/0876; H04L 63/10; H04L 63/20; H04L 63/0869; H04W 12/08
(Continued)

(56) References Cited

U.S. PATENT DOCUMENTS

| 7,496,768 B2 * | 2/2009 | Roberts | G06F 21/53 |
| | | | 380/200 |
| 9,258,296 B2 * | 2/2016 | Juthani | H04L 63/083 |

(Continued)

FOREIGN PATENT DOCUMENTS

| CN | 101206741 A | 6/2008 |
| CN | 101212291 A | 7/2008 |

(Continued)

OTHER PUBLICATIONS

Keegan, B., "How to transfer Google"s 2-factor authentication to a new iPhone in 14 easy steps, XP055638491, retreived from: https://www.brianckeegan.com/2016/09/how-to-transfer-googles-2-factor-authentication-to-a-new-phone/ , Sep. 3, 2015, 7 pages.

(Continued)

*Primary Examiner* — Longbit Chai
(74) *Attorney, Agent, or Firm* — Conley Rose, P.C.

(57) ABSTRACT

An authorization credential migration method includes: sending, by a first terminal device, an authorization credential immigration request for a trusted application to a service server; receiving an entered second authorization verification code of the trusted application; sending, by the first terminal device, the second authorization verification code to the service server, to instruct the service server to perform authorization authentication; and receiving, by the first terminal device, an authorization credential of the trusted application that is sent by the service server.

20 Claims, 7 Drawing Sheets

(58) Field of Classification Search
USPC .......................................................... 726/4
See application file for complete search history.

(56) References Cited

U.S. PATENT DOCUMENTS

| | | | |
|---|---|---|---|
| 10,735,436 B1* | 8/2020 | Chernilovsky | H04L 63/126 |
| 2012/0159105 A1 | 6/2012 | Von Behren et al. | |
| 2012/0239936 A1 | 9/2012 | Holtmanns et al. | |
| 2014/0007209 A1 | 1/2014 | Zucker | |
| 2014/0099933 A1 | 4/2014 | Yerrabommanahalli et al. | |
| 2015/0249540 A1* | 9/2015 | Khalil | H04L 9/3268 |
| | | | 713/158 |
| 2015/0331698 A1 | 11/2015 | Dietze et al. | |
| 2018/0139596 A1 | 5/2018 | Chen et al. | |

FOREIGN PATENT DOCUMENTS

| | | | |
|---|---|---|---|
| CN | 103415874 A | | 11/2013 |
| CN | 104038477 A | | 9/2014 |
| CN | 104603743 A | | 5/2015 |
| CN | 105591672 A | | 5/2016 |
| EP | 2461613 A1 | | 6/2012 |
| FR | 2461613 | * | 6/2012 |

OTHER PUBLICATIONS

Foreign Communication From A Counterpart Application, European Application No. 17891369.5, Extended European Search Report dated Nov. 13, 2019, 16 pages.
Machine Translation and Abstract of Chinese Publication No. CN101206741, Jun. 25, 2008, 26 pages.
Machine Translation and Abstract of Chinese Publication No. CN101212291, Jul. 2, 2008, 15 pages.
Machine Translation and Abstract of Chinese Publication No. CN104038477, Sep. 10, 2014, 5 pages.
Foreign Communication From A Counterpart Application, PCT Application No. PCT/CN2017/071189, English Translation of International Search Report dated May 27, 2017, 2 pages.
Foreign Communication From A Counterpart Application, PCT Application No. PCT/CN2017/071189, English Translation of Written Opinion dated May 27, 2017, 4 pages.
Foreign Communication From A Counterpart Application, Chinese Application No. 201780009044.2, Chinese Office Action dated Jan. 6, 2020, 13 pages.

* cited by examiner

AUTHORIZATION CREDENTIAL MIGRATION METHOD, TERMINAL DEVICE, AND SERVICE SERVER

CROSS-REFERENCE TO RELATED APPLICATIONS

This application is a national stage of International Application No. PCT/CN2017/071189, filed on Jan. 13, 2017, which is hereby incorporated by reference in its entirety.

TECHNICAL FIELD

This application relates to the field of communications technologies, and in particular, to an authorization credential migration method, a terminal device, and a service server.

BACKGROUND

A secure element (Secure Element, SE) is a security chip in a terminal device, and can avoid external malicious attacks. Currently, relatively important applications, for example, bank payment and an electronic bank USB-key (USB-KEY), in the terminal device are all installed in the SE. These applications installed in the secure element are referred to as trusted applications. When the trusted applications are installed and enabled, authorization data from a bank needs to be obtained. To obtain the authorization data, a user needs to go to a bank counter.

When the user changes the terminal device, the authorization data of the trusted application needs to be migrated from an old terminal device to a new terminal device. However, currently, the user needs to go to the bank counter for face-to-face signature, to apply for migration of an authorization credential of the trusted application. After checking an identity of the user, a bank staff revokes the authorization data from the old terminal device. Then, the user enters and uploads, to the new terminal device, a paper migration credential provided by the staff. After check of the migration credential, the authorization credential of the trusted application is delivered to the new terminal device. The user has to go to the counter for the face-to-face signature, wasting time and effort of the user and the bank. In addition, the user enters a migration verification code in a rich execution environment (Rich Executive Environment, REE) of the terminal. Trojan monitoring can be easily implanted in the REE of the terminal device. Consequently, an external attacker migrates the authorization data of the trusted applications to a malicious terminal device, causing heavy loss of the user.

SUMMARY

This application provides an authorization credential migration method, a terminal device, and a service server, to provide self-service migration of an authorization credential of an application for a user, and improve security of the migration of the authorization credential of the application.

According to a first aspect, an authorization credential migration method is provided.

A first terminal device sends an authorization credential immigration request for a trusted application to a service server, where the authorization credential immigration request is sent by the first terminal device over a secure channel in a trusted execution environment, the authorization credential immigration request includes a device identifier of the first terminal device, a secure element identifier of the first terminal device, an application identifier of the trusted application, and personal information of a user, and the first terminal device is a device into which an authorization credential is to be immigrated. The first terminal device receives a second authorization verification code of the trusted application that is entered by the user on a trusted user interface, where the second authorization verification code is entered by the user after the user views a first authorization verification code displayed on a second terminal device. The first terminal device sends, to the service server, the second authorization verification code entered by the user, to instruct the service server to perform first authorization authentication. The first terminal device receives the authorization credential of the trusted application that is sent by the service server, where the authorization credential of the trusted application is sent by the service server after the service server sets up a mapping relationship between the device identifier of the first terminal device and the authorization credential of the trusted application.

The first terminal device sends the authorization credential immigration request for the trusted application to the service server, and receives the second authorization verification code of the trusted application that is entered by the user on the trusted user interface. The first terminal device sends, to the service server, the second authorization verification code entered by the user, to instruct the service server to perform the first authorization authentication. The first terminal device is authorized for the trusted application by the service server, and the authorization credential of the trusted application is authorized by the service server after the service server sets up the mapping relationship between the device identifier of the first terminal device and the authorization credential of the trusted application. The first terminal device sends the authorization credential immigration request for the trusted application to the service server in the TEE, and sends the second authorization verification code entered by the user, so that the service server sets up the mapping relationship between the device identifier of the first terminal device and the authorization credential of the trusted application after the authentication of the first terminal device succeeds, to complete the authorization of the trusted application, thereby providing self-service migration of the authorization credential of the application for the user, and improving security in an authorization credential process.

With reference to the first aspect, in a first possible implementation of the first aspect, before the receiving, by the first terminal device, the authorization credential of the trusted application that is sent by the service server, the method further includes: receiving, by the first terminal device, a first verification code sent by the service server, and displaying the first verification code on the trusted user interface; receiving, by the first terminal device, a second verification code entered by the user on the trusted user interface; and sending, by the first terminal device to the service server, the second verification code entered by the user, to instruct the service server to perform second authorization authentication.

The user can be further identified by using the second verification code, thereby improving the security in the authorization credential process.

According to a second aspect, an authorization credential migration method is provided.

A second terminal device signs first data of a trusted application, where the first data of the trusted application includes a device identifier of the second terminal device, a secure element identifier of the second terminal device, an application identifier of the trusted application, and personal information of a user, and the second terminal device is a device from which an authorization credential is to be revoked. The second terminal device sends an authorization credential revocation request for the trusted application to a service server, where the authorization credential revocation request is sent by the second terminal device over a secure channel in a trusted execution environment, and the authorization credential revocation includes the signed first data of the trusted application. The second terminal device receives a first authorization verification code of the trusted application that is sent by the service server, and displays the first authorization verification code on a trusted user interface. The second terminal device receives a deletion request for the trusted application that is sent by the service server, and deletes the trusted application. The second terminal device sends a deletion response message for the trusted application to the service server.

According to a third aspect, an authorization credential migration method is provided.

A service server receives an authorization credential revocation request for a trusted application that is sent by a second terminal device, where the authorization credential revocation request includes a device identifier of the second terminal device, a secure element identifier of the second terminal device, an application identifier of the trusted application, and personal information of a user. The service server determines that identity authentication succeeds, generates a first authorization verification code, and sends the first authorization verification code to the second terminal device. The service server receives a second authorization verification code sent by a first terminal device, deletes a mapping relationship between the device identifier of the second terminal device and an authorization credential of the trusted application after determining that first authorization authentication succeeds, and sends a deletion request for the trusted application to the second terminal device. The service server receives a deletion response message for the trusted application that is sent by the second terminal device, sets up a mapping relationship between a device identifier of the first terminal device and an authorization credential of the trusted application, and sends the authorization credential of the trusted application to the first terminal device.

With reference to the third aspect, in a first possible implementation of the third aspect, the determining, by the service server, that identity authentication succeeds includes: determining, by the service server, whether a signature of first data that is of the trusted application and that is sent by the second terminal device and the device identifier of the second terminal device and the secure element identifier of the second terminal device that are in the first data of the trusted application are the same as those stored in the service server, and if yes, determining, by the service server, that the identity authentication succeeds.

With reference to the third aspect, in a second possible implementation of the third aspect, the generating, by the service server, a first authorization verification code includes: determining, by the service server based on the personal information of the user in the authorization credential revocation request, an authorization credential immigration request that is of the first terminal device and that corresponds to the personal information of the user; and generating, by the service server, the first authorization verification code based on the device identifier of the first terminal device in the authorization credential immigration request and a random number.

With reference to the third aspect, in a third possible implementation of the third aspect, the determining, by the service server, that first authorization authentication succeeds includes: determining, by the service server, whether the second authorization verification code is the same as the first authorization verification code, and if yes, determining, by the service server, that the first authorization authentication succeeds.

With reference to the third aspect, in a fourth possible implementation of the third aspect, before the deleting, by the service server, a mapping relationship between the device identifier of the second terminal device and an authorization credential of the trusted application, the method further includes: sending, by the service server, a first verification code to the first terminal device; receiving, by the service server, a second verification code sent by the first terminal device; and determining, by the service server based on the first verification code and the second verification code, that second authorization authentication succeeds.

With reference to the third aspect or the fourth possible implementation of the third aspect, in a fifth possible implementation of the third aspect, the determining, by the service server, that second authorization authentication succeeds includes: determining, by the service server, whether the first verification code is the same as the second verification code, and if yes, determining, by the service server, that the second authorization authentication succeeds.

According to a fourth aspect, a terminal device is provided.

The terminal device includes a radio frequency (English: Radio Frequency. RF) circuit, a processor, and a touch panel. The processor is configured to control the RF circuit to send an authorization credential immigration request for a trusted application to a service server, where the authorization credential immigration request is sent by the terminal device over a secure channel in a trusted execution environment, the authorization credential immigration request includes a device identifier of the terminal device, a secure element identifier of the terminal device, an application identifier of the trusted application, and personal information of a user, and the terminal device is a device into which an authorization credential is to be immigrated. The processor is further configured to control the touch panel to receive a second authorization verification code of the trusted application that is entered by the user on a trusted user interface, where the second authorization verification code is entered by the user after the user views a first authorization verification code displayed on a second terminal device. The processor is further configured to control the RF circuit to send, to the service server, the second authorization verification code entered by the user, to instruct the service server to perform first authorization authentication; and control the RF circuit to receive the authorization credential of the trusted application that is sent by the service server, where the authorization credential of the trusted application is sent by the service server after the service server sets up a mapping relationship between the device identifier of the terminal device and the authorization credential of the trusted application.

With reference to the fourth aspect, in a first possible implementation of the fourth aspect, the terminal device further includes a display panel. The processor is further configured to: before controlling the RF circuit to receive the authorization credential of the trusted application that is sent by the service server, control the RF circuit to receive a first verification code sent by the service server, and control the display panel to display the first verification code on the trusted user interface; control the touch panel to receive a second verification code entered by the user on the trusted user interface; and control the RF circuit to send, to the service server, the second verification code entered by the user, to instruct the service server to perform second authorization authentication.

According to a fifth aspect, a terminal device is provided.

The terminal device includes: an RF circuit, a processor, and a display panel. The processor is configured to sign first data of a trusted application, where the first data of the trusted application includes a device identifier of the terminal device, a secure element identifier of the terminal device, an application identifier of the trusted application, and personal information of a user, and the terminal device is a device from which an authorization credential is to be revoked. The processor is further configured to: control the RF circuit to send an authorization credential revocation request for the trusted application to a service server, where the authorization credential revocation request is sent by the terminal device over a secure channel in a trusted execution environment, and the authorization credential revocation includes the signed first data of the trusted application; control the RF circuit to receive a first authorization verification code of the trusted application that is sent by the service server, and control the display panel to display the first authorization verification code on a trusted user interface; control the RF circuit to receive a deletion request for the trusted application that is sent by the service server, and delete the trusted application; and control the RF circuit to send a deletion response message for the trusted application to the service server.

According to a sixth aspect, a service server is provided.

The service server includes a processor and a communications module. The processor is configured to control the communications module to receive an authorization credential revocation request for a trusted application that is sent by a second terminal device, where the authorization credential revocation request includes a device identifier of the second terminal device, a secure element identifier of the second terminal device, an application identifier of the trusted application, and personal information of a user. The processor is further configured to: determine that identity authentication succeeds, generate a first authorization verification code, and control the communications module to send the first authorization verification code to the second terminal device; control the communications module to receive a second authorization verification code sent by a first terminal device, delete a mapping relationship between the device identifier of the second terminal device and an authorization credential of the trusted application after determining that first authorization authentication succeeds, and control the communications module to send a deletion request for the trusted application to the second terminal device; and control the communications module to receive a deletion response message for the trusted application that is sent by the second terminal device, set up a mapping relationship between a device identifier of the first terminal device and an authorization credential of the trusted application, and control the communications module to send the authorization credential of the trusted application to the first terminal device.

With reference to the sixth aspect, in a first possible implementation of the sixth aspect, the processor is specifically configured to: determine whether a signature of first data that is of the trusted application and that is sent by the second terminal device and the device identifier of the second terminal device and the secure element identifier of the second terminal device that are in the first data of the trusted application are the same as those stored in the service server, and if yes, determine that the identity authentication succeeds.

With reference to the sixth aspect, in a second possible implementation of the sixth aspect, the processor is specifically configured to: determine, based on the personal information of the user in the authorization credential revocation request, an authorization credential immigration request that is of the first terminal device and that corresponds to the personal information of the user; and generate the first authorization verification code based on the device identifier of the first terminal device in the authorization credential immigration request and a random number.

With reference to the sixth aspect, in a third possible implementation of the sixth aspect, the processor is specifically configured to: determine whether the second authorization verification code is the same as the first authorization verification code, and if yes, determine that the first authorization authentication succeeds.

With reference to the sixth aspect, in a fourth possible implementation of the sixth aspect, the processor is further configured to: before deleting the mapping relationship between the device identifier of the second terminal device and the authorization credential of the trusted application, control the communications module to send a first verification code to the first terminal device; control the communications module to receive a second verification code sent by the first terminal device; and determine, based on the first verification code and the second verification code, that second authorization authentication succeeds.

With reference to the sixth aspect or the fourth possible implementation of the sixth aspect, in a fifth possible implementation of the sixth aspect, the processor is specifically configured to: determine whether the first verification code is the same as the second verification code, and if yes, determine that the second authorization authentication succeeds.

According to a seventh aspect, an embodiment of the present invention provides a terminal device. The terminal device includes function modules configured to implement the method according to the first aspect.

According to an eighth aspect, an embodiment of the present invention further provides a terminal device. The terminal device includes function modules configured to implement the method according to the second aspect.

According to a ninth aspect, an embodiment of the present invention further provides a service server. The service server includes function modules configured to implement the method according to the third aspect.

According to a tenth aspect, an embodiment of the present invention further provides a computer storage medium. The computer storage medium stores program code, and the program code includes an instruction used to implement any possible implementation of the method according to the first aspect, the second aspect, or the third aspect.

DESCRIPTION OF EMBODIMENTS

The technical solutions in this application are clearly and completely described below with reference to the accompanying drawings in this application.

Figure 1:
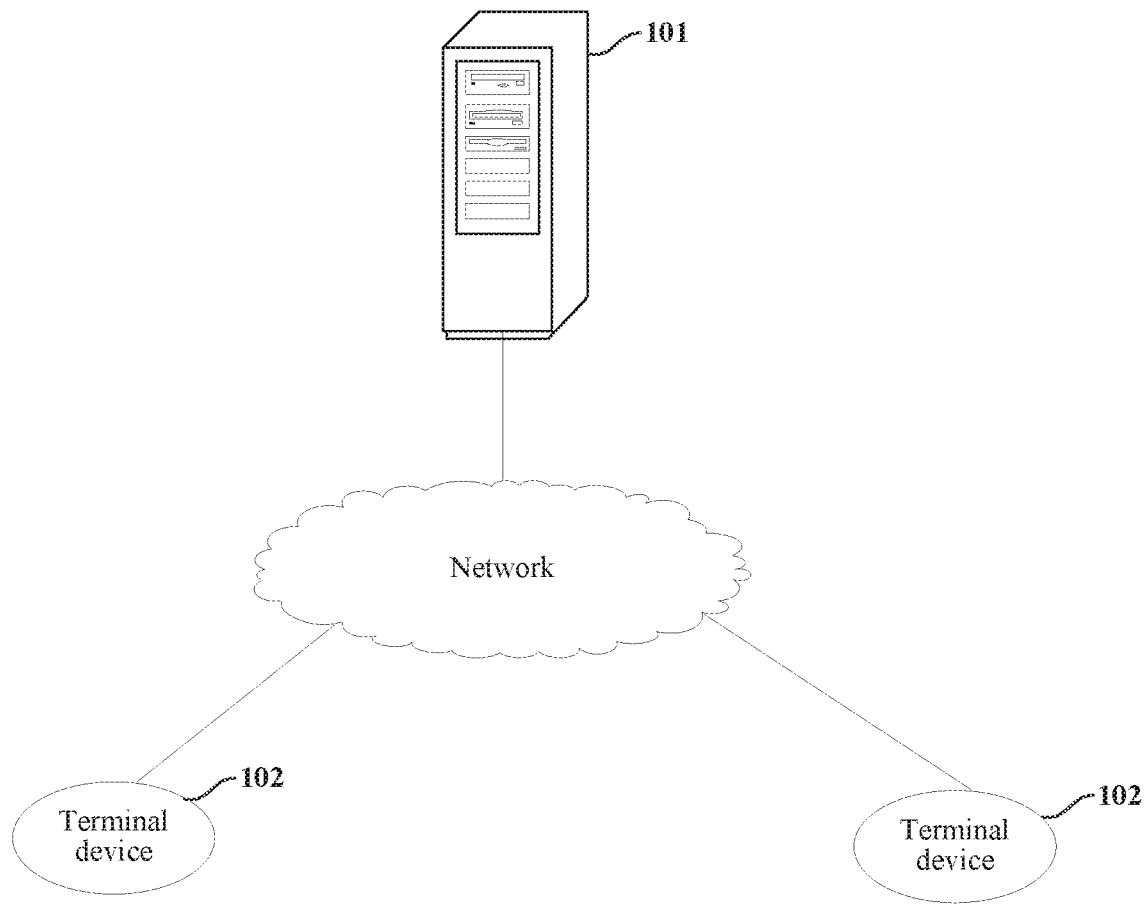
FIG. 1 is a schematic diagram of a system architecture according to this application.

FIG. 1 shows a system architecture to which this application is applicable. A data migration procedure can be implemented based on the system architecture. The system architecture provided in this application for controlling migration of an authorization credential includes a service server 101 and two terminal devices 102. The two terminal devices 102 are separately connected to the service server 101 through a network, so that after revoking an authorization credential of an application from one terminal device 102, the service server 101 generates a new authorization credential, and then delivers the new authorization credential to the other terminal device 102.

Figure 2:
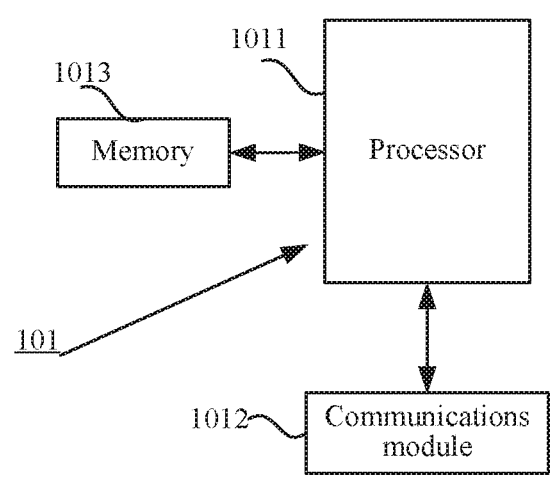
FIG. 2 is a schematic structural diagram of a service server according to this application.

The service server 101 in FIG. 1 may include a processor 1011, a communications module 1012, and a memory 1013. A specific structure is shown in FIG. 2.

The communications module 1012 is configured to: connect to the network, communicate with the terminal device 102 through the network, and receive downlink data sent by the terminal device 102 or send uplink data to the terminal device 102, to implement communication.

The processor 1011 is a control center of the service server 101, and is connected to all components of the entire service server 101 by using various interfaces and lines. The processor 1011 runs or executes a software program and/or a module stored in the memory 1013 and invokes data stored in the memory 1013, to implement various functions and data processing of the service server 101. Optionally, the processor 1011 may include one or more processing units.

The memory 1013 may be configured to store the software program and the module. The processor 1011 runs the software program and the module that are stored in the memory 1013, to implement various function applications and data processing of a mobile phone. The memory 1013 may mainly include a program storage area and a data storage area. The program storage area may store an operating system, an application program required by at least one function (such as a voice playback function and an image playback function), and the like. The data storage area may store data (such as audio data and a phone book) created based on use of the mobile phone, and the like. In addition, the memory 1013 may include a high speed random access memory, and may further include a non-volatile memory, such as at least one magnetic disk storage device, a flash memory, or other volatile solid-state storage devices.

The terminal device 102 in FIG. 1 may be a device having a trusted execution environment (Trusted Executive Environment, TEE), for example, a mobile phone, a hand ring, a tablet computer, a notebook computer, an ultra-mobile personal computer (English: Ultra-Mobile Personal Computer, UMPC), a personal digital assistant (English: Personal Digital Assistant, PDA) device, an vehicle-mounted device, or a wearable device that has the TEE, and is not limited only to a communications terminal.

Figure 3:
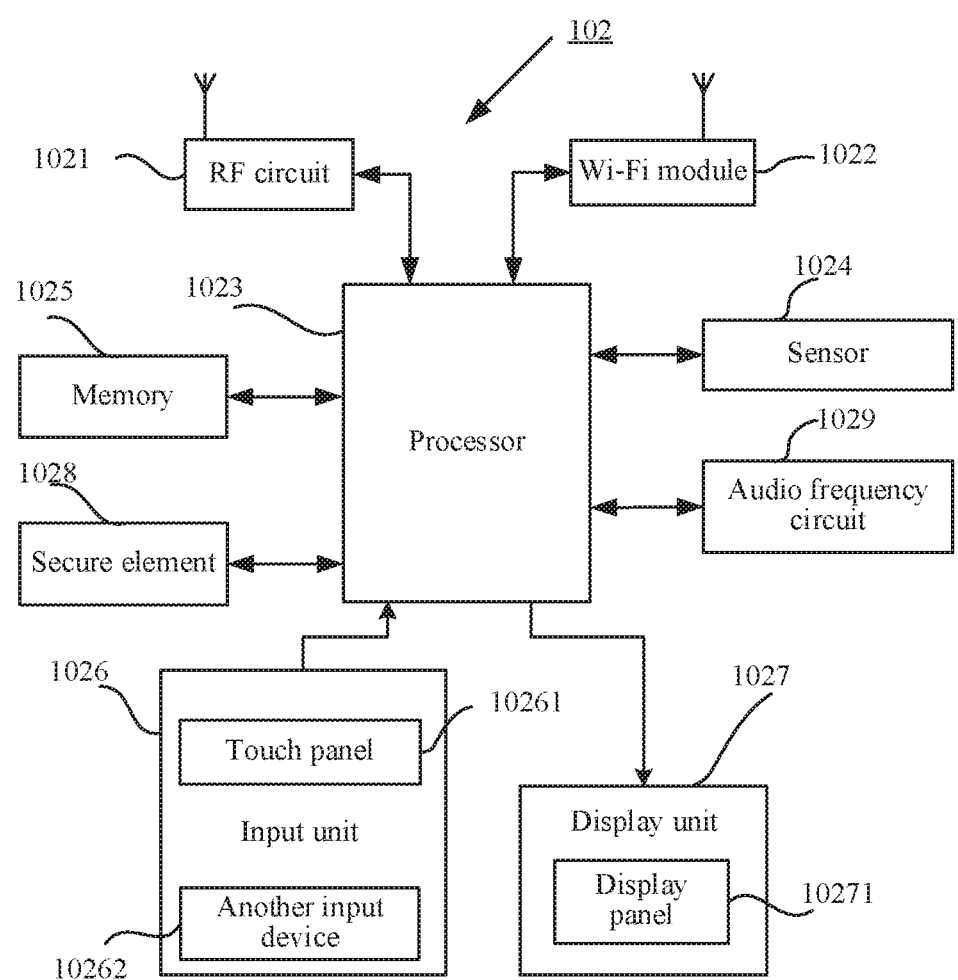
FIG. 3 is a schematic structural diagram of a terminal device according to this application.

As shown in FIG. 3, the terminal device 102 may include a radio frequency (English: Radio Frequency, RF) circuit 1021, a Wi-Fi module 1022, a processor 1023, a sensor 1024, a memory 1025, an input unit 1026, a display unit 1027, a secure element (Secure Element, SE) 1028, and an audio frequency circuit 1029.

A person skilled in the art may understand that a structure of the terminal device 102 shown in FIG. 3 is only an example instead of a limitation. The terminal device 102 may alternatively include more or fewer components than those shown in the figure, or some components may be combined, or components may be differently arranged.

The secure element 1028 is an independent physical chip, can avoid a hardware attack, and is configured to store important data and perform secure computing. In this application, an important trusted application, for example, a payment client of each bank and an electronic bank USB-key (USB-KEY) of each bank, is installed in the secure element 1028.

The RF circuit 1021 may be configured to receive and send a signal in a data information receiving and sending process or a call process. Particularly, after receiving downlink information sent by the service server 101, the RF circuit 1021 transmits the downlink information to the processor 1023 for processing. In addition, the RF circuit 1021 sends uplink information of the terminal to the service server 101 through the network, to implement communication with the network server 101. Usually, the RF circuit includes, but is not limited to, an antenna, at least one amplifier, a transceiver, a coupler, a low noise amplifier (English: Low Noise Amplifier, LNA), a duplexer, and the like. In addition, the RF circuit 1021 may also communicate with the network and another device through wireless communication. Any communication standard or protocol may be used for the wireless communication, and includes but is limited to Global System for Mobile Communications (English: Global System for Mobile Communication, GSM), General Packet Radio Service (English: General Packet Radio Service, GPRS), Code Division Multiple Access (English: Code Division Multiple Access, CDMA), Wideband Code Division Multiple Access (English: Wideband Code Division Multiple Access, WCDMA), Long Term Evolution (English: Long Term Evolution, LTE), email, and Short Message Service (English: Short Messaging Service, SMS).

The memory 1025 may be configured to store a software program and a module. The processor 1023 runs the software program and the module that are stored in the memory 1025, to implement various function applications and data processing of a mobile phone. The memory 1025 may mainly include a program storage area and a data storage area. The program storage area may store an operating system, an application program required by at least one function (such as a voice playback function and an image playback function), and the like. The data storage area may store data (such as audio data and a phone book) created based on use of the mobile phone, and the like. In addition, the memory 1025 may include a high speed random access memory, and may further include a non-volatile memory, such as at least one magnetic disk storage device, a flash memory, or other volatile solid-state storage devices. The memory 1025 is located in a rich execution environment (Rich Executive Environment. REE), independent of the secure element 1028, and configured to store unimportant data.

The input unit 1026 may be configured to receive an input digit or input character information, and generate a key signal related to user setting and function control of the terminal device 102. Specifically, the input unit 1026 may include a touch panel 10261 and another input device 10262. The touch panel 10261, also referred to as a touchscreen, may collect a touch operation of a user on or near the touch panel 10261 (such as an operation of the user on the touch panel 10261 or near the touch panel 10261 by using any suitable object or accessory such as a finger or a stylus), and drive a corresponding connection apparatus based on a preset program. Optionally, the touch panel 10261 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1023. Moreover, the touch controller can receive and execute a command sent from the processor 1023. In addition, the touch panel 10261 may be implemented in a plurality of types, such as a resistive type, a capacitive type, an infrared type, and a surface acoustic wave type. In this application, in addition to the touch panel 10261, the input unit 130 may further include the another input device 10262. Specifically, the another input device 10262 may include, but is not limited to, one or more of a physical keyboard, a functional key (such as a volume control key or a switch key), a trackball, a mouse, a joystick, and the like.

The display unit 1027 may be configured to display information entered by the user, information provided to the user, and various menus of the mobile phone. The display unit 1027 may include a display panel 10271. Optionally, the display panel 10271 may be configured in a form of a liquid crystal display unit (LCD, Liquid Crystal Display), an organic light-emitting diode (OLED, Organic Light-Emitting Diode), or the like. Further, the touch panel 10261 may cover the display panel 10271. After detecting the touch operation on or near the touch panel 10261, the touch panel 10261 transfers the touch operation to the processor 1023 to determine a touch event type. Subsequently, the processor 1023 provides a corresponding visual output on the display panel 10271 based on the touch event type.

The display panel 10271 on which the visual output can be recognized by human eyes may be used as a display device in this application, and is configured to display text information or image information. In FIG. 3, the touch panel 10261 and the display panel 10271 are used as two separate components to implement an input function and an output function of the terminal device 102. However, in some embodiments, the touch panel 10261 may cover the display panel 10271 to form a touch display screen. The touch display screen provides a preset display area for the user, to implement the input function and the output function of the terminal device 102. In this application, the touch display screen includes different display areas, and each display area may include an interface element such as an icon of at least one application program and/or a widget home screen widget.

In addition, the terminal device 102 may further include at least one sensor 1024 such as a gravity sensor, a distance sensor, and other sensors. Although FIG. 3 shows the sensor 1024, it may be understood that the sensor 1024 is not a mandatory part of the terminal device 102, and may be omitted as required without changing the essence of the present invention.

Wi-Fi is a short distance wireless transmission technology. The terminal device 102 may help, by using the Wi-Fi module 1022, the user receive and send an email, browse a web page, access streaming media, and the like, to provide wireless broadband Internet access for the user.

The processor 1023 is a control center of the terminal device 102, and is connected to all components of the entire terminal 10 by using various interfaces and lines. The processor 1023 runs or executes the software program and/or the module stored in the memory 1025, and invokes data stored in the memory 1025, to perform various functions and the data processing of the terminal 10, thereby performing overall monitoring on the terminal device 102. Optionally, the processor 1023 may include one or more processing units. Preferably, an application processor and a modem processor may be integrated into the processor 1023. The application processor mainly processes the operating system, a user interface, an application program, and the like. The modem processor mainly processes the wireless communication.

It may be understood that the foregoing modem processor may alternatively not be integrated into the processor 1023.

The audio frequency circuit 1029 may be configured to provide a voice input and a voice output for the user. For example, during voiceprint recognition, a voiceprint needs to be input by using the audio frequency circuit 1029.

The terminal device 102 further includes a power supply (not drawn in the figure) supplying power to the components.

Optionally, the power supply may be logically connected to the processor 1023 by using a power management system, thereby implementing functions such as charging, discharging, and power consumption management by using the power management system. Although not shown, the terminal device 102 may further include a Bluetooth module, a headset jack, and the like, and details are not described herein.

In this application, an authorization credential migration process needs to be performed in the TEE, and an application whose authorization credential needs to be migrated is located in the SE, to prevent the application from being maliciously attacked by an attacker in the authorization credential migration process.

It should be noted that, the structures included in the service server 101 shown in FIG. 2 and the terminal device 102 shown in FIG. 3 are merely an example, and are not limited in this application.

For ease of understanding and memory, in this application, a migration procedure of an authorization credential performed through interaction between the service server 101 and the terminal device 102 is described with reference to the specific structures of the service server 101 and the terminal device 102 in FIG. 1, FIG. 2, and FIG. 3 and by using an example of migrating an authorization credential of an electronic bank USB-key. In this application, all information exchange procedures are implemented over secure channels, and all inputs and outputs are implemented by using a trusted user interface (Trusted User Interface, TUI). A first terminal device is a device to which an authorization credential is to be immigrated, namely, a new terminal device, for example, a mobile phone. A second terminal device is a device from which an authorization credential is to be revoked, namely, an old terminal device, for example, a mobile phone or a computer connected to a bank USB-key.

Figure 4A:
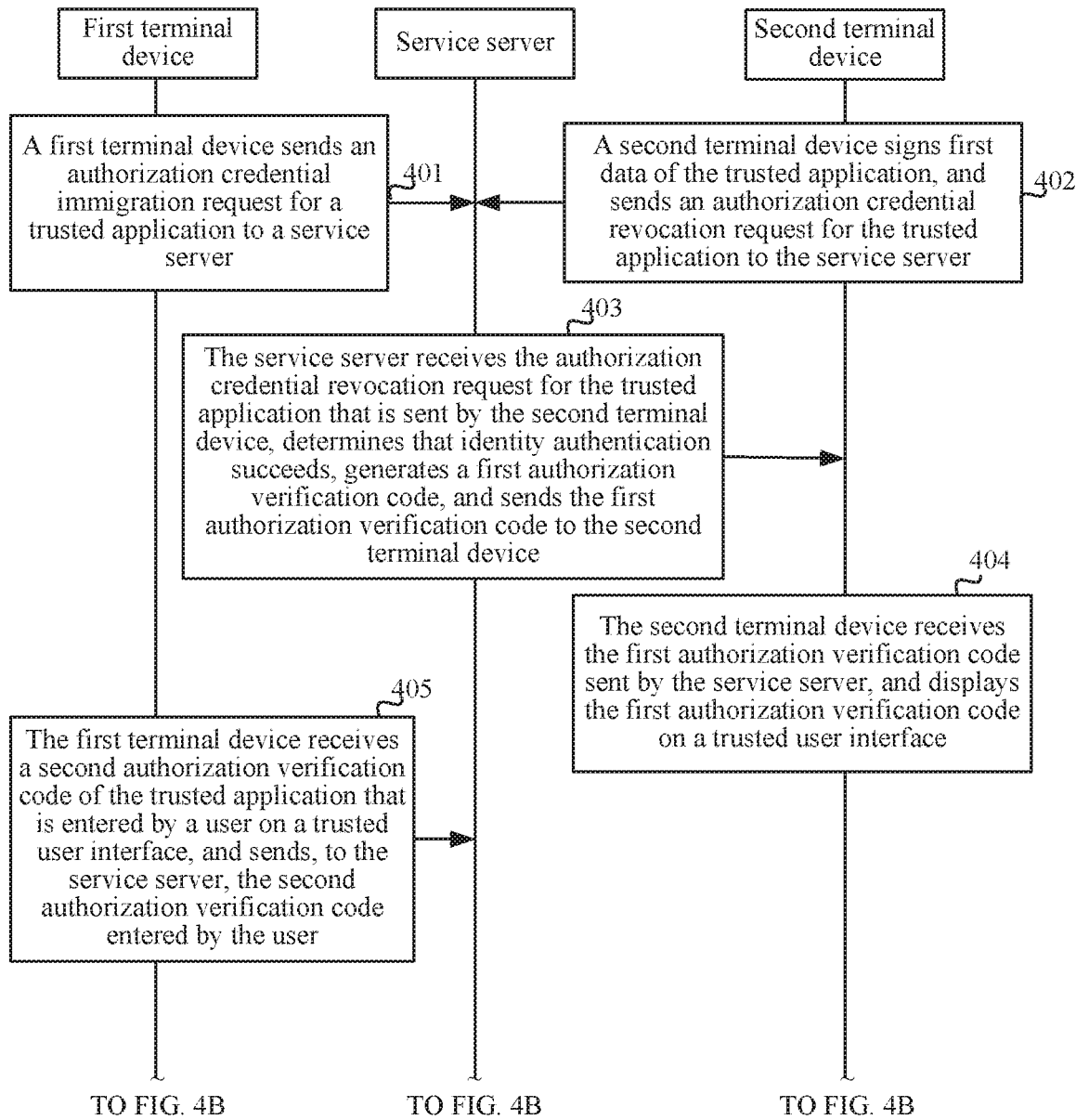
FIG. 4A and FIG. 4B are a schematic flowchart of an authorization credential migration method according to this application.
Figure 4B:
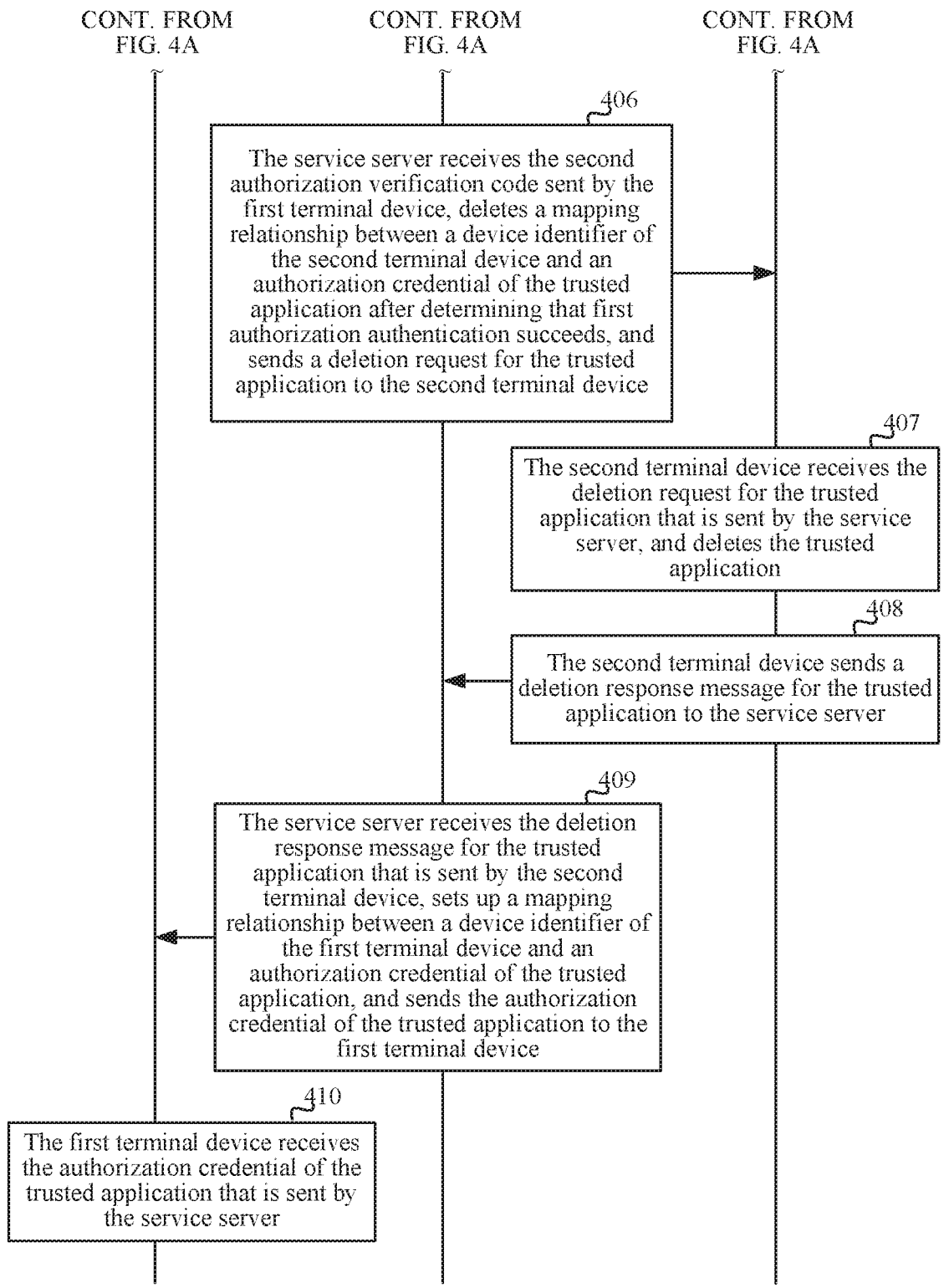

FIG. 4A and FIG. 4B show a procedure of an authorization credential migration method according to this application. With reference to FIG. 1 to FIG. 4A and FIG. 4B, the procedure specifically includes the following steps.

Step 401. A first terminal device sends an authorization credential immigration request for a trusted application to a service server.

When a user installs an electronic bank USB-key to the SE 1028 of the first terminal device, a secure channel is established between the first terminal device and the service server. The processor 1023 of the first terminal device may control the RF circuit 1021 or the Wi-Fi module 1022 to send the authorization credential immigration request for the trusted application to the service server over the secure channel. When application of the user for an authorization credential of the electronic bank USB-key succeeds, the first terminal automatically starts a TUI in a TEE, to provide a reliable input environment for the user.

The authorization credential immigration request for the trusted application carries a device identifier of the first terminal device, an SE identifier of the first terminal device, an application identifier of the trusted application, and personal information of the user. The device identifier may be a group of data used to distinguish from another terminal device, and for example, may be information such as a sequence number or a name of the terminal device. The SE identifier is a group of data for distinguishing from an SE in another terminal device, and for example, may be information such as an SE sequence number. The application identifier of the trusted application is used to distinguish from an authorization credential corresponding to a different application, so that the service server learns of a specific terminal device to which an authorization credential of a specific trusted application is to be authorized. In this application, the application identifier of the trusted application is an application identifier of the electronic bank USB-key. The personal information may be information such as an identification card number or a bank account of the user. The personal information may be entered by the user, or may be learned by the first terminal device by using another trusted application. The authorization credential immigration request for the trusted application may be set to be valid within a period, and for example, may be set to be valid within 30 minutes. If an authorization migration process is not completed over 30 minutes, the service server determines that the authorization migration fails, and the user needs to re-initiate the request.

Step 402. A second terminal device signs first data of the trusted application, and sends an authorization credential revocation request for the trusted application to the service server over a secure channel.

When needing to revoke an authorization credential of the electronic bank USB-key from an old terminal device, the user initiates an authorization credential revocation application on the second terminal device. In this case, the processor 1023 of the second terminal device controls the electronic bank USB-key in the SE 1028 to sign first data of the electronic bank USB-key. The first data may include a device identifier of the second terminal device, an SE identifier of the second terminal device, the application identifier of the electronic bank USB-key, and the personal information of the user. The secure channel is also established between the second terminal device and the service server. The processor 1023 may control the RF circuit 1021 or the Wi-Fi module 1022 to send an authorization credential revocation request for the electronic bank USB-key to the service server over the secure channel, to request the service server to revoke the authorization credential of the electronic bank USB-key from the second terminal device. In other words, the service server no longer authorizes the electronic bank USB-key of the second terminal device to use the authorization credential. The second terminal device can be prevented, by using the secure channel, from being maliciously attacked in a process of sending the authorization credential revocation request.

Optionally, when the second terminal device sends the authorization credential revocation request, identity authentication of the user further needs to be performed. For example, the user is prompted to perform fingerprint authentication or enter a PIN code for authentication by using a TUI interface; or the user may be prompted to perform voiceprint authentication, to determine authority of a user identity. A technical solution of the identity authentication is not limited in this application and is merely used as an example.

Step 403. The service server receives the authorization credential revocation request for the trusted application that is sent by the second terminal device, determines that identity authentication succeeds, generates a first authorization verification code, and sends the first authorization verification code to the second terminal device over the secure channel.

Before the processor 1011 of the service server can control the communications module 1012 to receive the authorization credential revocation request of the electronic bank USB-key that is sent by the second terminal device, the processor 1011 of the service server further needs to control the communications module 1012 to receive the authorization credential immigration request for the electronic bank USB-key that is sent by the first terminal device, and control the memory 1013 to store the authorization credential immigration request for the electronic bank USB-key that is sent by the first terminal device.

The processor 1011 of the service server needs to perform the identity authentication on the second terminal device. Specifically, the processor 1011 determines whether a signature of the first data in the authorization credential revocation request for the electronic bank USB-key and the device identifier of the second terminal device and the SE identifier of the second terminal device that are in the first data are the same as those stored in the service server, and if yes, determines that the identity authentication succeeds. It indicates that the second terminal device is a device trusted by the service server and the authorization credential revocation request is not generated by an attacker through a malicious attack, thereby improving security of migration of the authorization credential of the application.

After the identity authentication succeeds, the processor 1011 determines, based on the personal information of the user in the authorization credential revocation request sent by the second terminal device, the authorization credential immigration request that is of the first terminal device and that corresponds to the personal information of the user. In other words, the processor 1011 queries the authorization credential immigration request that is sent by the first terminal device and stored in the memory 1013 and that corresponds to the personal information of the user. If there is no matched authorization credential immigration request, the service server rejects the authorization credential emigration request. The processor 1011 generates the first authorization verification code based on the device identifier of the first terminal device in the queried authorization credential immigration request sent by the first terminal device and a random number generated by the processor 1011. The first authorization verification code may be a group of digits, and is generated by calculating the device identifier of the first terminal device and the random number by using an algorithm. For example, the two numbers are calculated by using a hashed message authentication code (Hash-based Message Authentication Code, HMAC), to generate a group of digits to be displayed on the second terminal device. The algorithm for generating the first authorization verification code is not limited in this application and is merely used as an example.

After obtaining the first authorization verification code, the processor 1011 controls the communications module 1012 to send the first authorization verification code to the second terminal device, so that the second terminal device displays the first authorization verification code on the trusted user interface, and the user can view the first authorization verification code of the user.

Step 404. The second terminal device receives the first authorization verification code sent by the service server, and displays the first authorization verification code on a trusted user interface.

Figure 5:
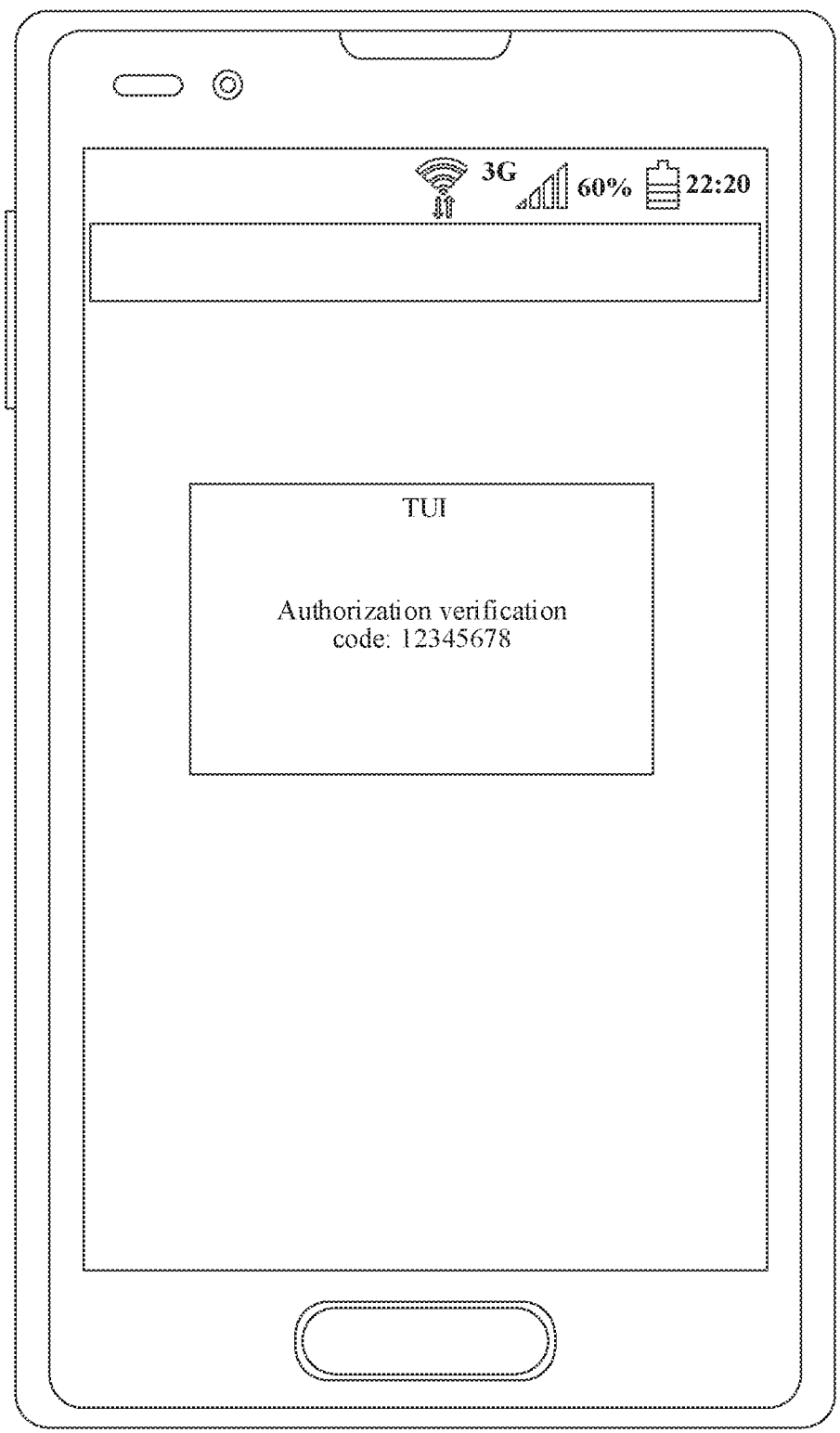
FIG. 5 is a schematic diagram of a display panel of a terminal device according to this application.

After controlling the RF circuit 1021 or the Wi-Fi module 1022 to receive the first authorization verification code sent by the service server, the processor 1023 of the second terminal device starts the TUI in the TEE, controls the display panel 10271, for example, a display panel 10271 of the second terminal device that is shown in FIG. 5, to display the first authorization verification code. The TUI interface displays an authorization verification code 12345678. The user may learn of the first authorization verification code by using the display panel 10271 of the second terminal device. The second terminal device displays the first authorization verification code, to prompt the user to enter the first authorization verification code on the first terminal device, so that the service server performs first authorization authentication, thereby improving the security of the migration of the authorization credential of the application.

Step 405. The first terminal device receives a second authorization verification code of the trusted application that is entered by a user on a trusted user interface, and sends, to the service server over the secure channel, the second authorization verification code entered by the user.

Figure 6:
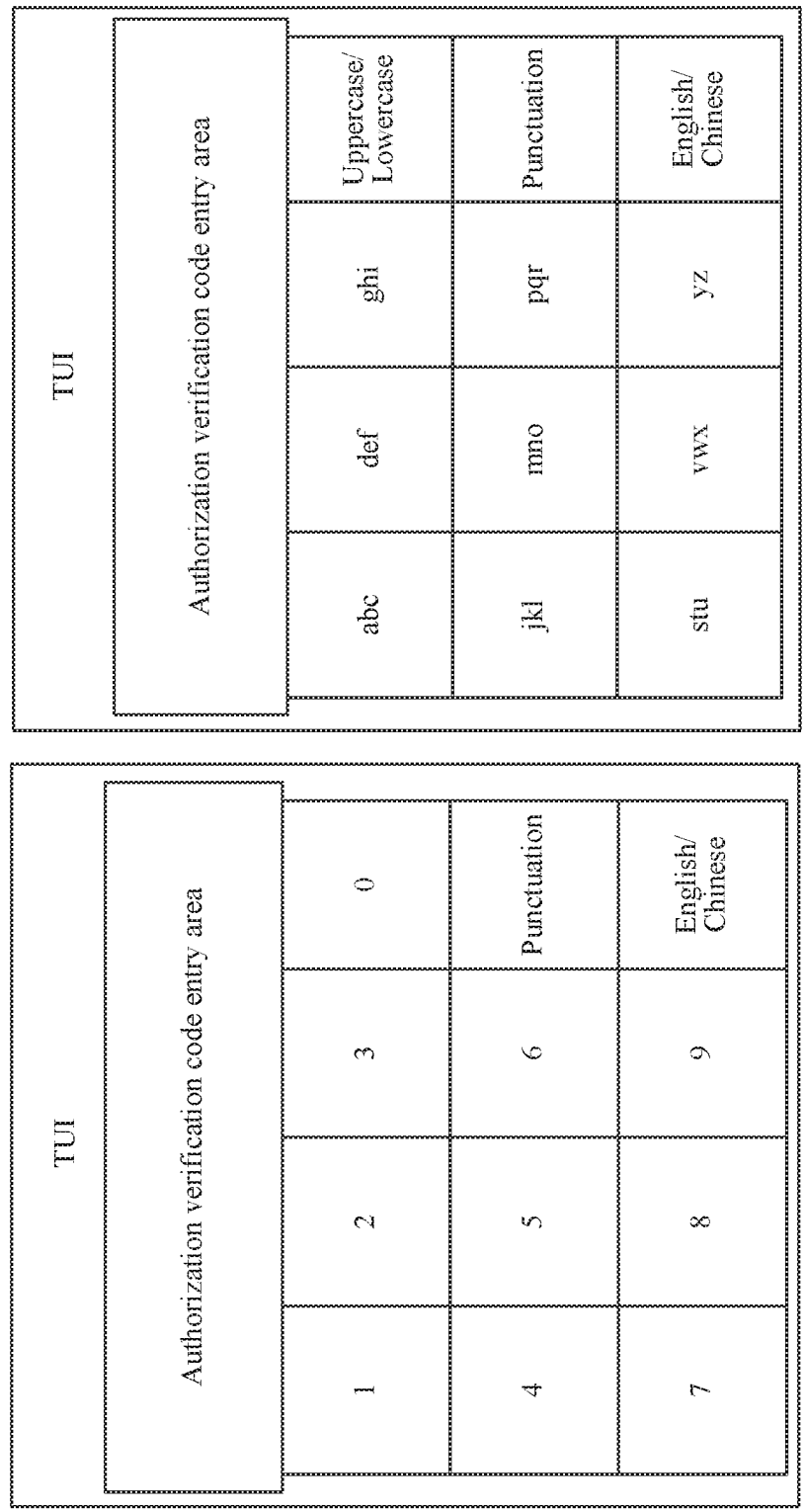
FIG. 6 is a schematic diagram of a display interface according to this application.

After viewing the first authorization verification code on the display panel 10271 of the second terminal device, the user needs to enter the first authorization verification code on the first terminal device. In this case, the first terminal device starts the TUI in the TEE, for example, a display interface shown in FIG. 6. The user enters the viewed first authorization verification code on the display interface shown in FIG. 6. The processor 1023 of the first terminal device may control the touch panel 10261 to receive the second authorization verification code entered on the TUI. The second authorization verification code may be the same as the first authorization verification code sent by the service server to the second terminal device, and it indicates that the user immigrating the authorization credential and the user revoking the authorization credential are a same user. The second authorization verification code may not be the same as the first authorization verification code sent by the service server to the second terminal device. In this case, the second authorization verification code may be erroneously entered by the user, or may be a malicious authorization verification code generated by the attacker by forging the first terminal device. Therefore, the processor 1023 of the first terminal device controls the RF circuit 1021 or the Wi-Fi module 1022 to send the second authorization verification code to the service server, so that the service server performs the first authorization authentication.

Step 406. The service server receives the second authorization verification code sent by the first terminal device, deletes a mapping relationship between a device identifier of the second terminal device and an authorization credential of the trusted application after determining that first authorization authentication succeeds, and sends a deletion request for the trusted application to the second terminal device.

The processor 1011 of the service server controls the communications module 1012 to receive the second authorization verification code sent by the first terminal device. Then, the processor 1011 determines whether the second authorization verification code is the same as the first authorization verification code sent to the second terminal device before, and if yes, determines that the first authorization authentication succeeds. It indicates that the user requesting to immigrate the authorization credential and the user requesting to revoke the authorization credential are the same user, thereby further improving the security in a migration process of the authorization credential of the application.

After determining that the first authentication succeeds, the processor 1011 controls the memory 1013 to delete a stored mapping relationship between the device identifier of the second terminal device and the authorization credential of the electronic bank USB-key, and controls the communications module 1012 to send a deletion request for the electronic bank USB-key to the second terminal device, to request the second terminal device to delete the electronic bank USB-key and the authorization credential of the electronic bank USB-key in the SE of the second terminal device. The authorization credential is generated when an account of the electronic bank USB-key is opened for the user and is stored in the memory 1013 of the service server. When the electronic bank USB-key uses the authorization credential, the service server needs to authorize the electronic bank USB-key and delivers the authorization credential. The processor 1011 deletes the mapping relationship between the device identifier of the second terminal device and the authorization credential of the electronic bank USB-key, and it indicates that an authority of the electronic bank USB-key in the second terminal device for using the authorization credential is revoked; and the processor 1011 instructs the second terminal device to delete the electronic bank USB-key, to prevent the electronic bank USB-key from being obtained by the attacker.

Step 407. The second terminal device receives the deletion request for the trusted application that is sent by the service server, and deletes the trusted application.

The processor 1023 of the second terminal device controls the RF circuit 1021 or the Wi-Fi module 1022 to receive the deletion request for the electronic bank USB-key that is sent by the service server, and determines that the electronic bank USB-key and the authorization credential can be deleted. In other words, the second terminal device agrees the service server to revoke the authorization credential of the electronic bank USB-key. Only when the authorization credential of the electronic bank USB-key is revoked from the second terminal device, the service server can set up a mapping relationship between the device identifier of the first terminal device and the authorization credential of the electronic bank USB-key, and the user completes self-service migration of the authorization credential of the application. The user does not need to go to a bank counter to migrate the authorization credential of the application, thereby saving time of the user.

Step 408. The second terminal device sends a deletion response message for the trusted application to the service server.

The processor 1023 of the second terminal device controls the RF circuit 1021 or the Wi-Fi module 1022 to send a deletion response message for the electronic bank USB-key to the service server, and it indicates that the second terminal device has deleted the electronic bank USB-key installed in the SE of the second terminal device and the authorization credential, so that the service server can set up the mapping relationship between the device identifier of the first terminal device and the authorization credential of the electronic bank USB-key.

Step 409. The service server receives the deletion response message for the trusted application that is sent by the second terminal device, sets up a mapping relationship between a device identifier of the first terminal device and an authorization credential of the trusted application, and sends the authorization credential of the trusted application to the first terminal device.

After the processor 1011 of the service server receives the deletion response message for the electronic bank USB-key that is sent by the second terminal device, the processor 1011 sets up the mapping relationship between the device identifier of the first terminal device and the authorization credential of the electronic bank USB-key, and authorizes the electronic bank USB-key of the first terminal device to use the authorization credential. The processor 1011 delivers the authorization credential of the electronic bank USB-key to the first terminal device. The authorization credential delivered to the first terminal device is a new authorization credential generated by the processor 1011 of the service server based on the authorization credential that is stored in the memory 1013 and that corresponds to the electronic bank USB-key instead of the authorization credential in the second terminal device.

Step 410: The first terminal device receives the authorization credential of the trusted application that is sent by the service server.

The processor 1023 of the first terminal device controls the RF circuit 1021 or the Wi-Fi module 1022 to receive the authorization credential of the electronic bank USB-key that is delivered by the service server, so that the service server completes authorization to the trusted application of the first terminal device, and the user completes the self-service migration of the authorization credential of the application.

To further enhance the security in the migration process of the authorization credential of the application, before the processor 1011 of the service server deletes the mapping relationship between the device identifier of the second terminal device and the authorization credential of the trusted application, the processor 1011 controls the communications module 1012 to send a first verification code to the first terminal device. The first verification code may be a second channel verification code, for example, an SMS verification code. The first verification code is valid in a specified period, and is used to verify whether the user immigrating the authorization credential and the user revoking the authorization credential are the same.

Before the first terminal device is authorized for the trusted application by the service server, the processor 1023 of the first terminal device may further control the RF circuit 1021 to receive the first verification code sent by the service server, to prompt the user to enter the seen first verification code on the TUI in the TEE, and starts the TUI in the TEE, so that the user can enter the verification code. The processor 1023 controls the touch panel 10261 to obtain a second verification code entered by the user, and controls the RF circuit 1021 to send the second verification code to the service server, so that the service server performs second authorization authentication.

The processor 1011 of the service server controls the communications module 1012 to receive the second verification code, then determines whether the second verification code is the same as the first verification code sent before, and if yes, determines that the second authorization authentication succeeds.

Optionally, when the second terminal device is a device connected to a USB-key, the foregoing steps need to be performed after the user logs in, on the second terminal device, to an online bank of a bank corresponding to the USB-key to set up a connection to the USB-key. The specific migration procedure of the authorization credential of the application has been specifically described in the foregoing embodiment, and details are not described herein again.

Optionally, in the migration process of the authorization credential of the trusted application in the foregoing embodiment, some other unauthorized data may be further migrated. In this case, the authorization credential immigration request of the first terminal device further includes a data migration list of the trusted application to indicate data needing to be migrated. After receiving the migration list, the service server may determine, according to a preset rule, to-be-migrated data needing to be migrated from the second terminal device to the first terminal device. The to-be-migrated data is also delivered to the first terminal device in the migration process of the authorization credential. In the migration process of the authorization credential, for other steps, refer to the foregoing embodiment, and details are not described herein again.

The foregoing embodiment indicates that, the first terminal device sends the authorization credential immigration request for the trusted application to the service server, and receives the second authorization verification code of the trusted application that is entered by the user on the trusted user interface. The first terminal device sends, to the service server, the second authorization verification code entered by the user, to instruct the service server to perform the first authorization authentication. The first terminal device is authorized for the trusted application by the service server, and the authorization credential of the trusted application is authorized by the service server after the service server sets up the mapping relationship between the device identifier of the first terminal device and the authorization credential of the trusted application. The first terminal device sends the authorization credential immigration request for the trusted application to the service server in the TEE, and sends the second authorization verification code entered by the user, so that the service server sets up the mapping relationship between the device identifier of the first terminal device and the authorization credential of the trusted application after the authentication of the first terminal device succeeds, to complete the authorization of the trusted application, thereby providing the self-service migration of the authorization credential of the application for the user, and improving the security in the process of the authorization credential of the application.

The procedure of the authorization credential migration method provided in this application is described above with reference to FIG. 1 to FIG. 6, and a terminal and a management server that are provided in the embodiments of the present invention are described below with reference to FIG. 7 to FIG. 9. The technology described in the foregoing method embodiment is also applicable to the following apparatus embodiment.

Figure 7:
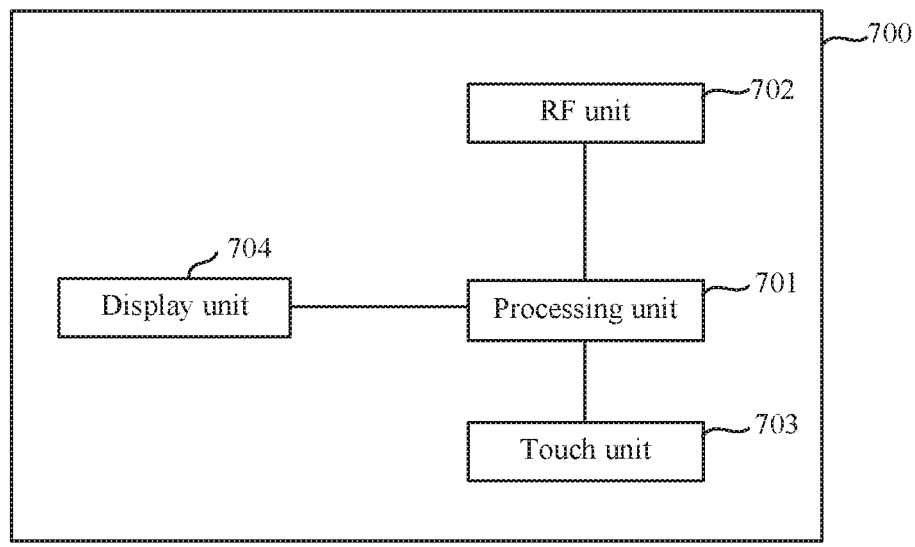
FIG. 7 is a schematic structural diagram of a terminal device according to this application.

FIG. 7 shows a terminal device 700 according to this application. The terminal device 700 can perform steps performed by the first terminal device in the foregoing method embodiment.

As shown in FIG. 7, the terminal device 700 includes an RF unit 702, a processing unit 701, and a touch unit 703. The processing unit 701 is configured to control the RF unit 702 to send an authorization credential immigration request for a trusted application to a service server, where the authorization credential immigration request is sent by the terminal device over a secure channel in a trusted execution environment, the authorization credential immigration request includes a device identifier of the terminal device, a secure element identifier of the terminal device, an application identifier of the trusted application, and personal information of a user, and the terminal device is a device into which an authorization credential is to be immigrated. The processing unit 701 is further configured to control the touch unit 703 to receive a second authorization verification code of the trusted application that is entered by the user on a trusted user interface, where the second authorization verification code is entered by the user after the user views a first authorization verification code displayed on a second terminal device. The processing unit 701 is further configured to control the RF unit 702 to send, to the service server, the second authorization verification code entered by the user, to instruct the service server to perform first authorization authentication; and control the RF unit 702 to receive the authorization credential of the trusted application that is sent by the service server, where the authorization credential of the trusted application is sent by the service server after the service server sets up a mapping relationship between the device identifier of the terminal device and the authorization credential of the trusted application.

Optionally, the terminal unit 700 further includes a display unit 704. The processing unit 701 is further configured to: before controlling the RF unit 702 to receive the authorization credential of the trusted application that is sent by the service server, control the RF unit 702 to receive a first verification code sent by the service server, and control the display panel to display the first verification code on the trusted user interface; control the touch unit 703 to receive a second verification code entered by the user on the trusted user interface; and control the RF unit 702 to send, to the service server, the second verification code entered by the user, to instruct the service server to perform second authorization authentication.

Figure 8:
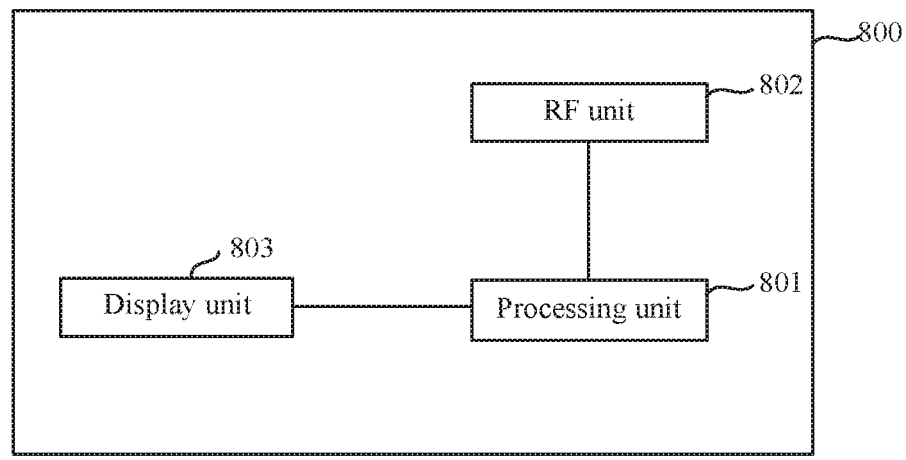
FIG. 8 is a schematic structural diagram of a terminal device according to this application.

FIG. 8 shows a terminal device 800 according to this application. The terminal device 800 can perform steps performed by the second terminal device in the foregoing method embodiment.

As shown in FIG. 8, the terminal device 800 includes: an RF unit 802, a processing unit 801, and a display unit 803. The processing unit 801 is configured to sign first data of a trusted application, where the first data of the trusted application includes a device identifier of the terminal device, a secure element identifier of the terminal device, an application identifier of the trusted application, and personal information of a user, and the terminal device is a device from which an authorization credential is to be revoked. The processing unit 801 is further configured to: control the RF unit 802 to send an authorization credential revocation request for the trusted application to a service server, where the authorization credential revocation request is sent by the terminal device over a secure channel in a trusted execution environment, and the authorization credential revocation includes the signed first data of the trusted application; control the RF unit 802 to receive a first authorization verification code of the trusted application that is sent by the service server, and control the display unit 803 to display the first authorization verification code on a trusted user interface; control the RF unit 802 to receive a deletion request for the trusted application that is sent by the service server, and delete the trusted application; and control the RF unit 802 to send a deletion response message for the trusted application to the service server.

Figure 9:
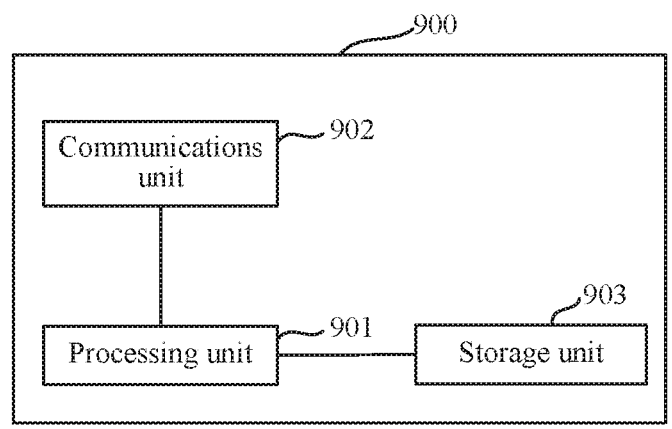
FIG. 9 is a schematic structural diagram of a service server according to this application.

FIG. 9 shows a service server 900 according to this application. The service server 900 can perform steps performed by the service server in the foregoing method embodiment.

As shown in FIG. 9, the service server includes a processing unit 901 and a communications unit 902. The processing unit 901 is configured to control the communications unit 902 to receive an authorization credential revocation request for a trusted application that is sent by a second terminal device, where the authorization credential revocation request includes a device identifier of the second terminal device, a secure element identifier of the second terminal device, an application identifier of the trusted application, and personal information of a user. The processing unit 901 is further configured to: determine that identity authentication succeeds, generate a first authorization verification code, and control the communications unit 902 to send the first authorization verification code to the second terminal device; control the communications unit 902 to receive a second authorization verification code sent by a first terminal device, delete a mapping relationship between the device identifier of the second terminal device and an authorization credential of the trusted application after determining that first authorization authentication succeeds, and control the communications unit 902 to send a deletion request for the trusted application to the second terminal device; and control the communications unit 902 to receive a deletion response message for the trusted application that is sent by the second terminal device, set up a mapping relationship between a device identifier of the first terminal device and an authorization credential of the trusted application, and control the communications unit 902 to send the authorization credential of the trusted application to the first terminal device.

Optionally, the processing unit 901 is specifically configured to determine whether a signature of first data that is of the trusted application and that is sent by the second terminal device and the device identifier of the second terminal device and the secure element identifier of the second terminal device that are in the first data of the trusted application are the same as those stored in the service server, and if yes, determine that the identity authentication succeeds.

Optionally, the processing unit 901 is specifically configured to: determine, based on the personal information of the user in the authorization credential revocation request, an authorization credential immigration request that is of the first terminal device and that corresponds to the personal information of the user; and generate the first authorization verification code based on the device identifier of the first terminal device in the authorization credential immigration request and a random number.

Optionally, the processing unit 901 is specifically configured to determine whether the second authorization verification code is the same as the first authorization verification code, and if yes, determine that the first authorization authentication succeeds.

Optionally, the processing unit 901 is further configured to: before deleting the mapping relationship between the device identifier of the second terminal device and the authorization credential of the trusted application, control the communications unit 902 to send a first verification code to the first terminal device; control the communications unit 902 to receive a second verification code sent by the first terminal device; and determine, based on the first verification code and the second verification code, that second authorization authentication succeeds.

Optionally, the processing unit 901 is specifically configured to determine whether the first verification code is the same as the second verification code, and if yes, determine that the second authorization authentication succeeds.

A person skilled in the art should understand that this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of any other programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, implemented by an electronic device, for immigrating an authorization credential of a trusted application into a first electronic device, wherein the first electronic device comprises a secure element (SE), wherein the trusted application is installed in the SE, and wherein the method comprises:
    establishing a first secure channel directly communicated between the first electronic device and a service server;
    sending, over the secure channel in a trusted execution environment (TEE), an authorization credential immigration request to the service server;
    receiving, over the secure channel in the TEE, first user input indicating a first authorization verification code, wherein the first authorization verification code relates to a second authorization verification code displayed on a second electronic device, and wherein the second electronic device is a device from which an authorization credential is to be revoked via a second secure channel directly communicated between the service server and the second electronic device;
    sending, over the secure channel in the TEE, to the service server, the first authorization verification code to prompt the service server to perform first authorization authentication and to delete a first mapping relationship between a device identifier of the second electronic device and an authorization credential of the trusted application after determining that first authorization authentication succeeds and to set up a second mapping relationship between the first electronic device and the authorization credential of the trusted application; and
    receiving, over the secure channel in the TEE, the authorization credential of the trusted application from the service server.

2. The method of claim 1, wherein the first authorization verification code is the same as the second authorization verification code.

3. The method of claim 1, wherein before receiving the authorization credential of the trusted application from the service server, the method further comprises:
    receiving a first verification code from the service server;
    displaying the first verification code;
    receiving second user input indicating a second verification code, wherein the second verification code relates to the first verification code; and
    sending to the service server, the second verification code to prompt the service server to perform second authorization authentication.

4. The method of claim 3, wherein the second verification code is the same as the first verification code.

5. The method of claim 1, wherein the first user input is received using a trusted user interface (TUI) in the TEE.

6. The method of claim 1, wherein the authorization credential immigration request comprises a device identifier of the first electronic device, an SE identifier of the first electronic device, an application identifier of the trusted application, and personal information of a user.

7. The method of claim 1, wherein the authorization credential immigration request is set to be valid within a predetermined period.

8. The method of claim 1, wherein the SE comprises an independent physical chip.

9. A first electronic device for an authorization credential migration, comprising:
   a secure element (SE) comprising a trusted application;
   a memory storing executable instructions; and
   a processor device coupled to the SE and the memory, wherein the processor device is configured to execute the instructions and cause the first electronic device to:
   establish a first secure channel directly communicated between the first electronic device and a service server;
   send, over the secure channel in a trusted execution environment (TEE), an authorization credential immigration request to the service server;
   receive, over the secure channel in the TEE, first user input indicating a first authorization verification code, wherein the first authorization verification code relates to a second authorization verification code displayed on a second electronic device, and wherein the second electronic device is a device from which an authorization credential is to be revoked via a second secure channel between the service server and the second electronic device;
   send, over the secure channel in the TEE, to the service server to prompt the service server to perform first authorization authentication and to delete a first mapping relationship between a device identifier of the second electronic device and an authorization credential of the trusted application after determining that first authorization authentication succeeds and to set up a second mapping relationship between the first electronic device and the authorization credential of the trusted application; and
   receive, over the secure channel in the TEE, the authorization credential of the trusted application from the service server.

10. The first electronic device of claim 9, wherein the first authorization verification code is the same as the second authorization verification code.

11. The first electronic device of claim 9, wherein the instructions further cause the first electronic device to:
   receive a first verification code from the service server;
   display the first verification code;
   receive second user input indicating a second verification code, wherein the second verification code relates to the first verification code; and
   send the second verification code to the service server, to instruct the service server to perform second authorization authentication.

12. The first electronic device of claim 11, wherein the second verification code is the same as the first verification code.

13. The first electronic device of claim 9, wherein the first user input is received using a trusted user interface (TUI) in the TEE.

14. The first electronic device of claim 9, wherein the authorization credential immigration request comprises a device identifier of the first electronic device, an SE identifier of the first electronic device, an application identifier of the trusted application, and personal information of a user.

15. The first electronic device of claim 9, wherein the authorization credential immigration request is set to be valid within a predetermined period.

16. The first electronic device of claim 9, wherein the SE comprises an independent physical chip.

17. A method, implemented by a service server, for immigrating an authorization credential of a trusted application into a first electronic device, wherein the first electronic device comprises a secure element (SE), wherein the trusted application is installed in the SE, and wherein the method comprises:
   establishing a first secure channel directly communicated between the service server and the first electronic device;
   receiving, over the first secure channel in a trusted execution environment (TEE), an authorization credential immigration request from the first electronic device;
   establishing a second secure channel directly communicated between the service server and a second electronic device;
   receiving, over the second secure channel, an authorization credential revocation request from the second electronic device, wherein the second electronic device is a device from which an authorization credential is to be revoked via the second secure channel;
   generating a second authorization verification code;
   sending, over the second secure channel, the second authorization verification code to the second electronic device;
   receiving, over the first secure channel, a first authorization verification code from the first electronic device, wherein the first authorization verification code relates to the second authorization verification code;
   deleting a first mapping relationship between a device identifier of the second electronic device and an authorization credential of the trusted application after determining that first authorization authentication succeeds;
   subsequently setting up a second mapping relationship between a device identifier of the first electronic device and an authorization credential of the trusted application; and
   sending, over the first secure channel, the authorization credential of the trusted application to the first electronic device.

18. The method of claim 17, wherein the first authorization verification code is the same as the second authorization verification code.

19. The method of claim 17, wherein the authorization credential immigration request comprises a device identifier of the first electronic device, an SE identifier of the first electronic device, an application identifier of the trusted application, and personal information of a user.

20. The method of claim 19, wherein generating the second authorization verification code comprises generating the second authorization verification code based on the device identifier of the first electronic device and a random number.

* * * * *